United States Patent [19]

Arai et al.

[11] Patent Number: 4,744,093
[45] Date of Patent: May 10, 1988

[54] METHOD OF DETECTING PHASE PULSE SIGNALS FROM AN AC DISTRIBUTION LINE

[75] Inventors: Yukio Arai; Masatoshi Takagi, both of Saitama; Akihiko Koyama, Tokyo, all of Japan

[73] Assignee: Osaki Electric Co., Ltd., Tokyo, Japan

[21] Appl. No.: 874,227

[22] Filed: Jun. 13, 1986

Related U.S. Application Data

[63] Continuation-in-part of Ser. No. 567,087, Dec. 30, 1983, abandoned.

[30] Foreign Application Priority Data

Jan. 10, 1983 [JP] Japan .................................. 58-2043

[51] Int. Cl.$^4$ ............................................. G08B 23/00
[52] U.S. Cl. .................................. 375/76; 340/310 R; 340/538
[58] Field of Search ............... 340/310 R, 310 A, 358, 340/531; 307/350, 358; 328/146, 147, 149; 375/76; 455/343

[56] References Cited

U.S. PATENT DOCUMENTS

| 3,838,448 | 9/1974 | Garde et al. | 375/76 |
| 3,947,769 | 3/1976 | Rousos et al. | 375/76 |
| 4,399,547 | 8/1983 | Moore et al. | 340/310 A |
| 4,463,341 | 7/1984 | Iwasaki | 340/310 A |
| 4,554,532 | 11/1985 | Ise et al. | 340/538 |
| 4,608,552 | 8/1986 | Boutonnat et al. | 340/310 A |

Primary Examiner—Benedict V. Safourek
Attorney, Agent, or Firm—Collard, Roe & Galgano

[57] ABSTRACT

A method of detecting the levels of phase pulse signals involves the establishment of a pilot channel in addition to channels into which phase pulse signals are injected. Prior to the injection of the phase pulse signals, a transmitter injects a pilot signal into the pilot channel. A receiver sets a reception threshold level to a level somewhat lower than the peak level of the pilot signal, and a detection of the levels of the phase pulse signals is carried out by comparing the phase pulse signals with the reception threshold level established by the pilot signal so that ghost signals below the threshold level are eliminated.

4 Claims, 6 Drawing Sheets

METHOD OF DETECTING PHASE PULSE SIGNALS FROM AN AC DISTRIBUTION LINE

BACKGROUND OF THE INVENTION

This is a continuation-in-part of application Ser. No. 567,087 filed Dec. 30, 1983, now abandoned.

This invention relates to a method and apparatus for eliminating ghost pulses on a low-voltage a.c. distribution line by establishing a pilot channel so that a pilot or start signal can be first inserted into the pilot channel and the threshold level of the channel is set slightly lower than the peak value of the pilot signal or pulse, so that subsequent signals can be compared with the preset threshold level and lower level ghost signals can be eliminated from the distribution line.

DESCRIPTION OF THE PRIOR ART

A phase pulse signal is generated when a portion of a line such as a low-voltage distribution line is brought momentarily into a short-circuit state by a capacitor and an inductor to cause an abrupt voltage change in an a.c. voltage wave. As shown in FIG. 1, phase pulse signals 1, 1' are separated from an a.c. voltage wave 2 in a receiver, but levels 3, 3' thereof vary widely, depending upon the distance from a transmitter. As seen in FIG. 2, in receivers available at present, a reception threshold level 4 is set to a predetermined constant level, so that any subsequent oscillation 5 of the phase pulse signal 1' is likely to be higher than the reception threshold level 4. Consequently, a ghost pulse 7 occurs in addition to the signal pulse 6. The phase pulse signals 1, 1' are injected into allotted channels of a plurality of channels that are established by dividing one cycle of the a.c. voltage wave 2 into predetermined phase angular widths, and are then transmitted to the receiver. As shown in FIG. 3, however, any subsequent oscillation 5 of the phase pulse signal 1' enters a channel $CH_2$ adjacent the allotted channel $CH_1$, so that the ghost pulse 7 occurs in channel $CH_2$, causing reception error.

To eliminate this problem, applicants had previously proposed a level-detection method as shown in FIG. 4 (see Japanese Patent Laid-Open No. 38023/1982). This method involves the steps of setting threshold levels $L_1$, ... in stages, changing over and holding each threshold level as the reception threshold level whenever the level of the instantaneous value of the phase pulse signal 1 exceeds each threshold level in sequence from the lowest threshold level (level $L_2$ is serving as the reception threshold level in the drawing), and thus detecting the level of the phase pulse signal 1.

In accordance with this method, however, subsequent oscillation 5 of the phase pulse signal 1 could still be higher than the reception threshold level $L_2$ from time to time, so that the ghost pulse 7 will still occur in addition to the signal pulse 6. This problem can be solved by dividing the threshold levels into finer stages, but this requires an increase in the number of inverters and flip-flops in the level-detection circuit, and the circuit construction is more complicated.

SUMMARY OF THE INVENTION

It is therefore an object of the present invention to provide a method of detecting the levels of phase pulse signals which can efficiently prevent the occurrence of ghost pulses due to subsequent oscillations.

In accordance with the present invention, a pilot channel of a predetermined phase angle width is set with a phase angle reference point of an a.c. voltage wave acting as a reference. A pilot signal and phase pulse signals are injected by a transmitter into the pilot channel and into other channels subsequent to the pilot channel, respectively. The reception threshold level is set to a level considerably lower than the peak level of the pilot signal when the pilot signal is received by a receiver in the pilot channel, and the levels of phase pulse signals are detected on the basis of the reception threshold level. This arrangement can efficiently prevent the occurrence of ghost pulses due to subsequent oscillations when phase pulse signals are received.

DESCRIPTION OF THE PRFERRED EMBODIMENTS

Figure 5:
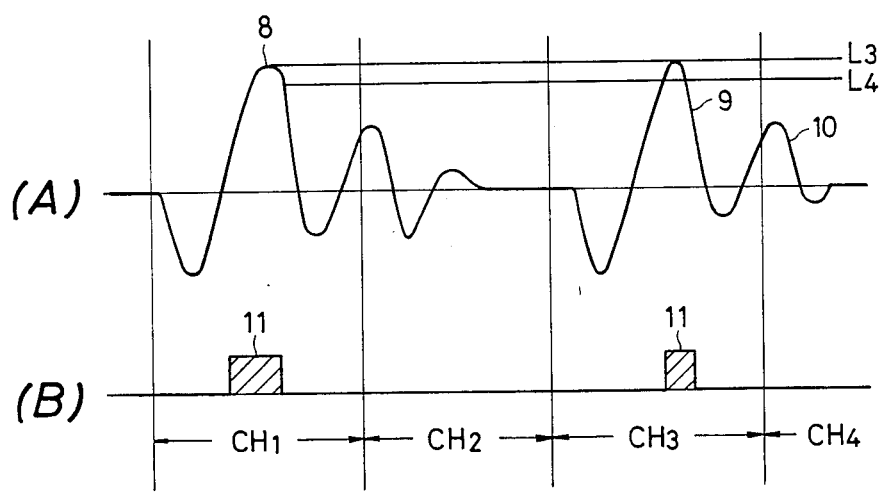
FIG. 5 discloses waveform diagrams (A) and (B) explaining the level-detection method in accordance with the present invention.

Turning now in detail to the drawings, FIG. 5 depicts a pilot channel $CH_1$ of a predetermined phase angle width which is set with a phase angle reference point of an a.c. voltage wave acting as a reference. A pilot signal 8 from a transmitter is injected into the pilot channel $CH_1$ and phase pulse signals 9 are injected into other channels $CH_2$, $CH_3$, $CH_4$, ... that follow the pilot channel $CH_1$. When a receiver in the pilot channel $CH_1$ receives pilot signal 8, a reception threshold level $L_4$ is set and held at a level which is somewhat lower than the peak level $L_3$ of pilot signal 8. Thus, the peak level of subsequent oscillation 10 is lower than reception threshold level $L_4$ so that no ghost pulse occurs and only a signal pulse 11 can be detected.

When peak level $L_3$ of pilot signal 8 is set at 1, the ratio of the reception threshold level $L_4$ thereto is preferably set to be about 0.8.

Figure 6:
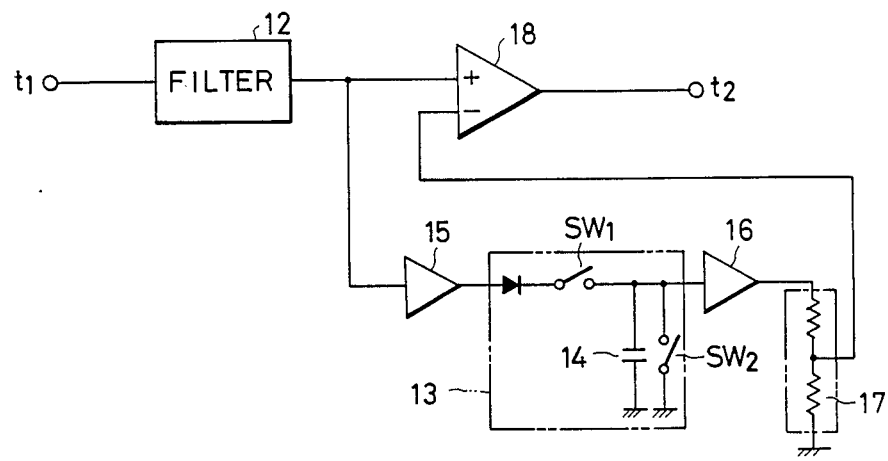
FIG. 6 is a circuit diagram of a level-detection circuit practicing the method and apparatus of the present invention.

FIG. 6 is a circuit diagram of a specific example of a level-detection circuit practicing the method of the present invention. The circuit operation will be described with reference to FIG. 7. An a.c. voltage wave onto which pilot signal 8 as well as phase pulse signal 9 are superimposed is fed into input terminal $t_1$ connected to a distribution line or the like. Pilot signal 8 and phase pulse signal 9 are separated from the a.c. voltage wave by a filter 12.

Figure 7:
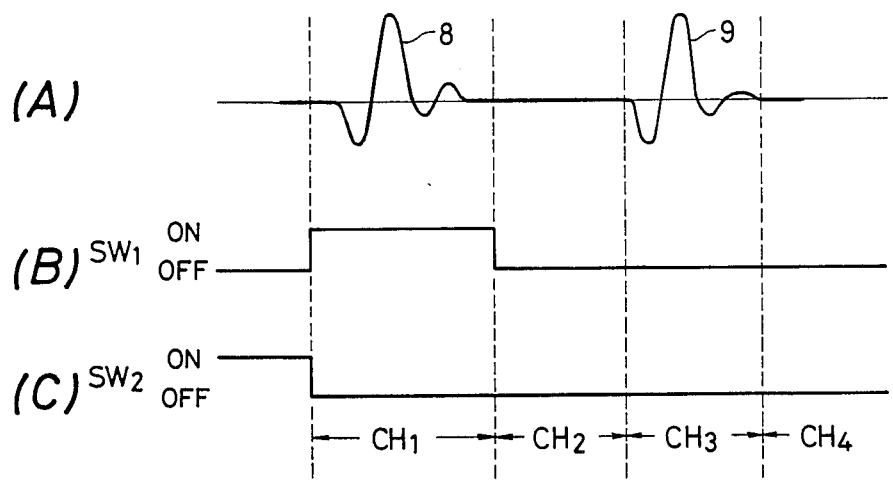
FIG. 7 discloses waveforms (A), (B) and (C) which show the operation of a threshold circuit in the level-detection circuit.

Pilot channel $CH_1$ is set in advance to a position at a predetermined phase angle with the phase angle reference point of the a.c. voltage wave acting as the reference, and subsequent phase pulse channels $CH_2$, $CH_3$ $CH_4$, . . . are also set in advance to follow pilot channel $CH_1$. As shown in FIG. 7, a first switch $SW_1$ is on and a second switch $SW_2$ is off in pilot channel $CH_1$, and both of them are off in subsequent phase pulse channels $CH_2$, $CH_3$ . . . . Pilot signal 8 received in pilot channel $CH_1$, is fed through a buffer 15, to a capacitor 14 of a threshold circuit 13 equipped with switches $SW_1$ and $SW_2$. The voltage of capacitor 14 is held at peak level $L_3$ (FIG. 5) of pilot signal 8 when pilot channel $CH_1$ ends, and is subjected to impedance conversion by a buffer 16. Reception threshold level $L_4$ as seen in FIG. 5, is set in accordance with a ratio predetermined by a voltage divider 17.

The reception threshold level $L_4$ thus set, connected to the input of a comparator 18, where it is compared with the phase pulse signal 9 input to the comparator through filter 12. When phase pulse signal 9 is found to be higher than the reception threshold level $L_4$ as a result, it is output as a signal pulse 11 from a terminal $t_2$.

In a terminal encoder system in which several phase pulse channels are allotted to the same transmitter in order to transmit addresses or data after it is encoded, the reception threshold level set in the manner described above is held for a period of time corresponding to the phase pulse channels or to the two cycles of the a.c. voltage wave.

Figure 8:
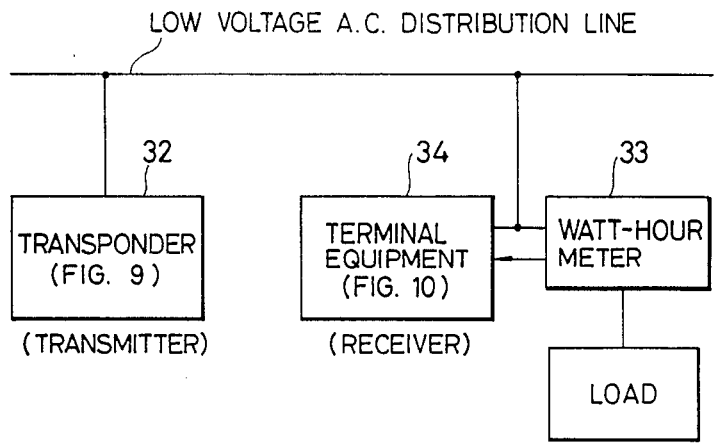
FIG. 8 is an electrical block diagram showing the transponder coupled to the low voltage distribution line for communicating to the terminal equipment and the watthour meter.

For example, the level-detection method shown in FIG. 5 or the level-detection circuit shown in FIG. 6 is actually used in an automatic meter reading system by low voltage a.c. distribution line. Especially, the circuit of FIG. 6 is suitable for a phase pulse signal detector of a terminal equipment. FIG. 8 shows a general composition of the automatic meter reading system.

As shown in FIG. 8, a transponder 32, serving as a transmitter, is connected through the low voltage a.c. distribution line with a terminal equipment 34 serving as a receiver and other terminal equipment (not shown). Terminal equipment 34 counts and memorizes every unit pulse sent from connected watthour meter 33 when it measures a unit of electric energy (for example, 1 pulse/kWH).

Figure 1:
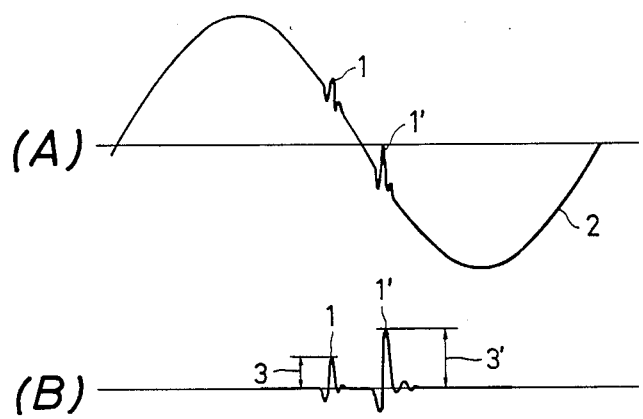
FIG. 1 discloses waveform diagrams (A) and (B) of the levels of ordinary phase pulse signals.
Figure 2:
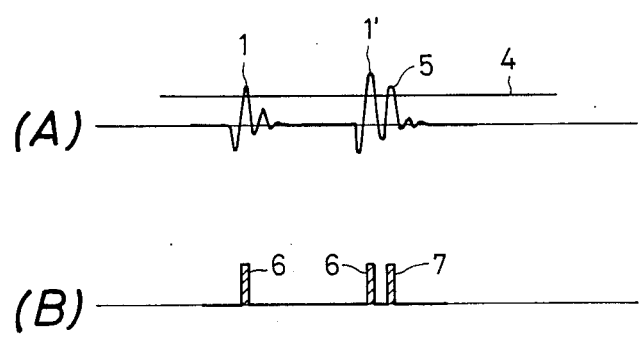
FIG. 2 are waveform diagrams (A) and (B) showing the occurrence of a ghost pulse due to subsequent oscillation.
Figure 3:
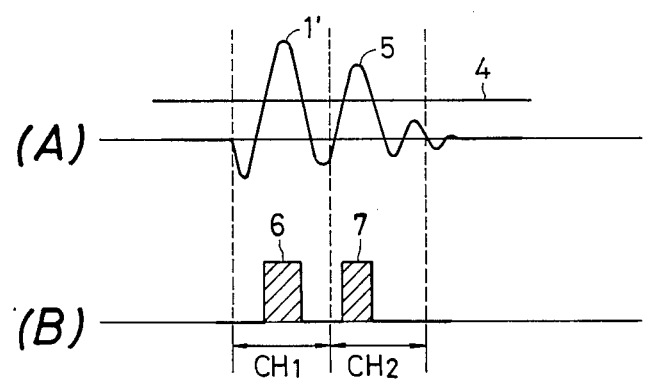
FIG. 3 discloses waveform diagrams (A) and (B) showing an erroneous reception due to a ghost pulse.
Figure 4:
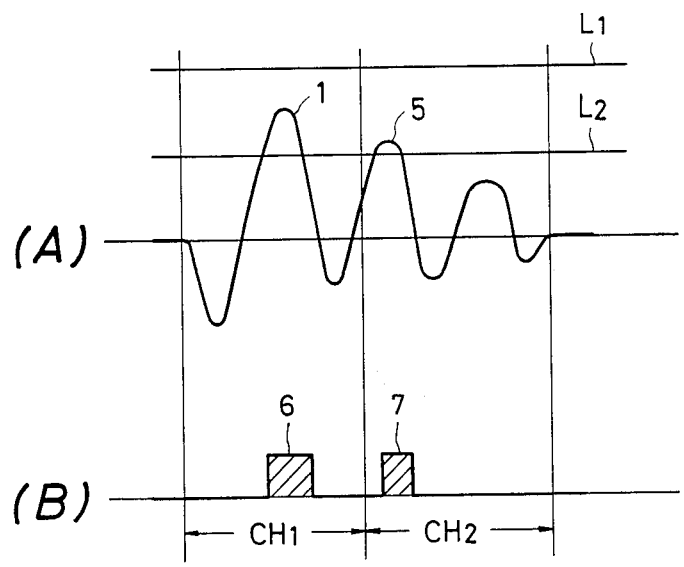
FIG. 4 discloses waveform diagrams (A) and (B) used to explain a level-detection method previously proposed in the prior art.
Figure 9:
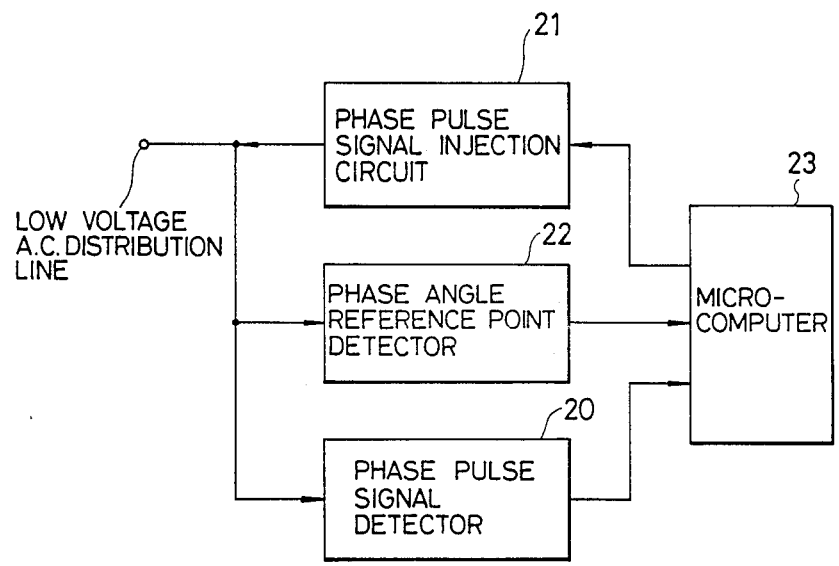
FIG. 9 is an electrical block diagram of the transponder circuit in detail.
Figure 11:
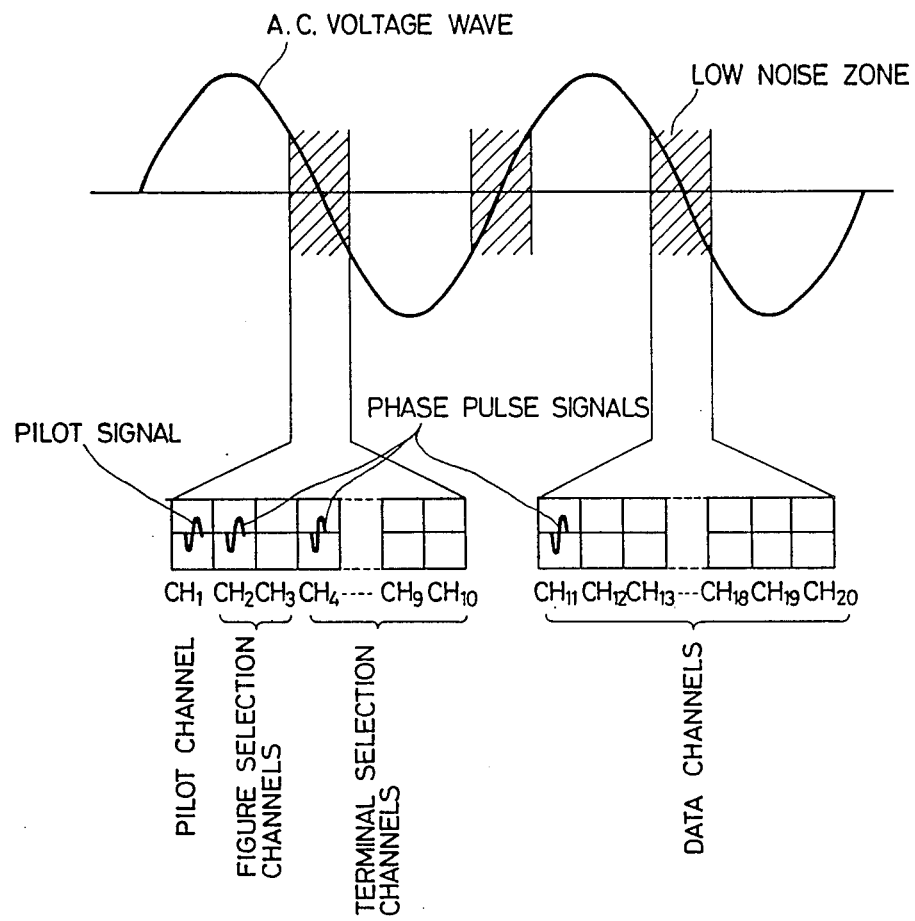
FIG. 11 is a waveform diagram of the low voltage distribution line showing the creation of multiple channels in the low noise zone of the distribution wave for transmitting and receiving signals between the transponder and the terminal equipment.

The electrical block diagram of transponder 32 is shown in FIG. 9. Microcomputer 23 is set to establish channels on the a.c. voltage wave of the distribution line. For example, as shown in FIG. 11, pilot channel $CH_1$, figure selection channel $CH_2$ and $CH_3$, and terminal selection channels $CH_4$–$CH_{10}$ are established in the low noise zone of the first cycle of the a.c. voltage wave. Likewise, data channels $CH_{11}$–$CH_{20}$ are established in the low noise zone of the second cycle. The position of each channel is detected by counting time from the phase angle reference point (0° or 90°) of the a.c. voltage wave which is detected by the phase angle reference point detector 22. When data, memorized in terminal equipment 34 is to be read out, microcomputer 23 instructs phase pulse signal injection circuit 21 to send; a pilot signal into pilot channel $CH_1$ (FIG. 11), a phase pulse signal corresponding to a predetermined figure of the data in the figure selection channels $CH_2$ and $CH_3$, and a phase pulse signal corresponding to address of terminal equipment 34 in the terminal selection channels $CH_4$–$CH_{10}$. Phase pulse signal detector 20 receives a phase pulse signal in data channels $CH_{11}$–$CH_{20}$ sent from terminal equipment 34. See U.S. Pat. No. 4,563,679, FIGS. 4 and 5 and columns 3–5 (Yukio Arai et al) concerning the details of the operation of transponder 32 and terminal equipment 34.

Figure 10:
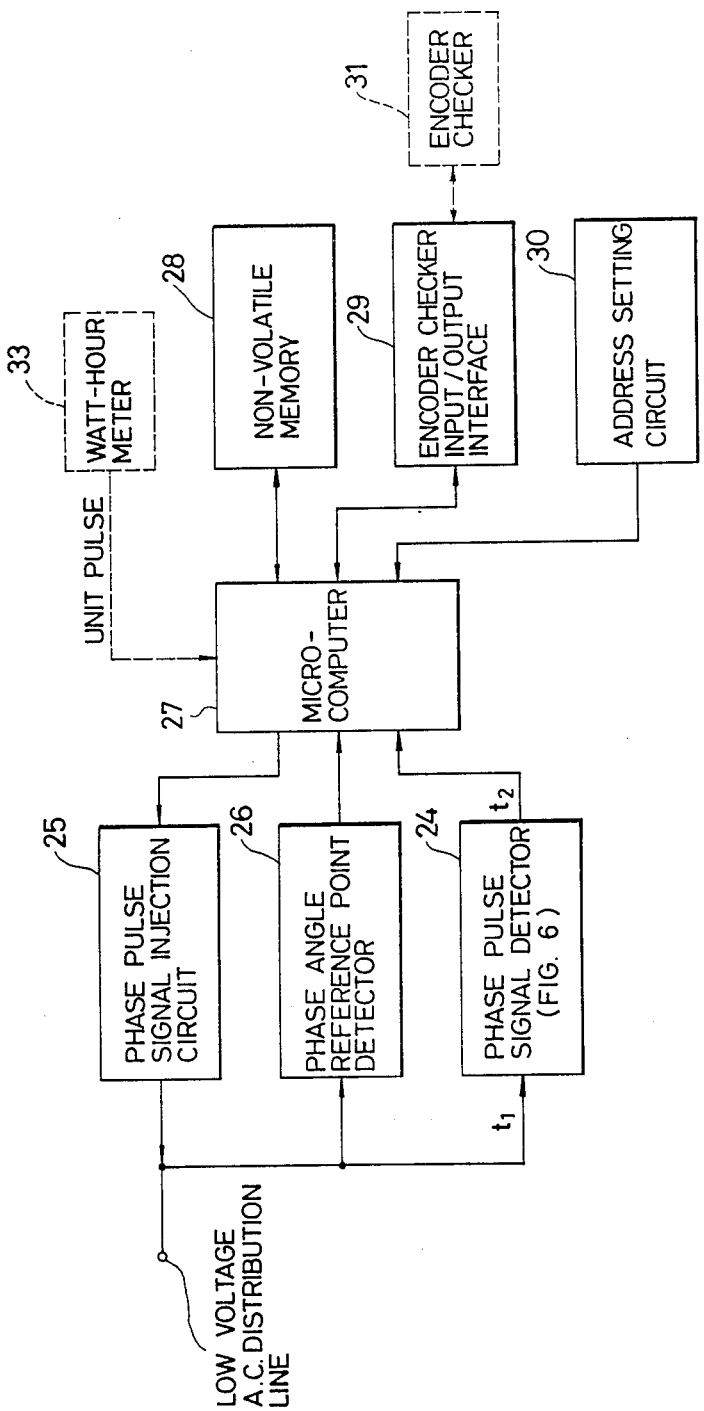
FIG. 10 is an electrical block diagram of the terminal equipment.

A block diagram of terminal equipment 34 is shown in FIG. 10. Microcomputer 27 is set to establish the same channels as at transponder 32. Microcomputer 27 receives and counts unit pulses sent from watthour meter 33 which correspond to the quantity of power measured and used. This data can be read out or can be modified from an external source by encoder checker 31, as shown in FIG. 10. Address setting circuit 30 sets the address assigned to this terminal equipment. Phase pulse signal detector 24 for which the level-detection circuit shown in FIG. 6 is used detects the pilot signal in the pilot channel $CH_1$, the phase pulse signal in the figure selection channels $CH_2$ and $CH_3$, and the phase pulse signal in the terminal selection channels $CH_4$–$CH_{10}$. When microcomputer 27 detects the address decoded from the phase pulse signal coinciding the address of this terminal equipment, it instructs phase pulse signal injection circuit 25 to send the data memorized in the non-volatile memory 28 by injecting the phase pulse signal in the data channels $CH_{11}$–$CH_{20}$.

In an actual embodiment of phase pulse signal detector 24, as shown in FIG. 6, filter 12 consists of a single-feedback second-order high-pass filter having cutoff frequency of 3 KHz. Buffers 15 and 16 are voltage followers for converting high impedance to low impedance with a 1:1 gain, and typically NEC parts uPC803C. Comparator 18 which has two inputs can be any comparator amplifier such as NEC part uPC271C. Capacitor 14 is typically a film capacitor and can have a range between 1–10 nF. Voltage divider 17 may typically consist of two resistors, the uppermost being 50 Kohms, the lowermost being 5 Kohms.

While only one embodiment of the present invention has been shown and described, it is obvious that many changes and modifications may be made thereunto, without departing from the spirit and scope of the invention.

What is claimed is:

1. A method of detecting the levels of phase pulse signals, superimposed on a voltage wave of an a.c. distribution line by a receiver coupled to the distribution line whereby a pilot channel and a plurality of subsequent channels are established by dividing one cycle of the a.c. voltage wave into predetermined phase angular widths, comprising the steps of:
   filtering the a.c. voltage wave on the distribution line to separate from the a.c. voltage wave, phase pulse signals and a pilot signal, said pilot signal having a predetermined phase angle width with a predetermined phase angle reference point, wherein the a.c. voltage wave acts as the reference;
   inserting said pilot signal into the pilot channel and said phase pulse signals into the channels subsequent to said pilot channel;
   establishing a predetermined reception threshold level for the reception of said phase pulse signals at a preset lower level than the peak level of the pilot signal in the pilot channel; and comparing the phase pulse signals received with said reception threshold level to thereby detect as signal pulses in channels subsequent to the pilot channel, waveforms of a level higher than the reception threshold level.

2. The method of claim 1, wherein said step of comparing comprises coupling said pilot signal to the input of a peak detector, and dividing by a voltage divider the peak level of the pilot signal by a predetermined ratio so as to set the reception threshold level.

3. The method of claim 2, wherein said step of dividing comprises setting the predetermined ratio of said voltage divider to about 0.8 with respect to the peak level of the pilot signal.

4. The method of claim 1, wherein said set reception threshold level is maintained for a plurality of cycles of the a.c. voltage wave.

* * * * *